United States Patent
Petersen

(10) Patent No.: US 10,011,958 B2
(45) Date of Patent: Jul. 3, 2018

(54) LIGHT REFERENCE SYSTEM

(71) Applicant: HARSCO TECHNOLOGIES LLC, Fairmont, MN (US)

(72) Inventor: Michael Petersen, Scottville, MI (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 154 days.

(21) Appl. No.: 15/286,009

(22) Filed: Oct. 5, 2016

(65) Prior Publication Data

US 2017/0096783 A1  Apr. 6, 2017

Related U.S. Application Data

(60) Provisional application No. 62/237,137, filed on Oct. 5, 2015.

(51) Int. Cl.
| | |
|---|---|
| *H04N 7/18* | (2006.01) |
| *E01B 35/10* | (2006.01) |
| *G06K 9/00* | (2006.01) |
| *G06T 7/00* | (2017.01) |
| *H04N 5/225* | (2006.01) |
| *H04N 5/247* | (2006.01) |

(52) U.S. Cl.
CPC .......... *E01B 35/10* (2013.01); *G06K 9/00791* (2013.01); *G06T 7/001* (2013.01); *H04N 5/2256* (2013.01); *H04N 5/247* (2013.01); *H04N 7/181* (2013.01); *E01B 2203/16* (2013.01); *G06T 2207/30252* (2013.01)

(58) Field of Classification Search
CPC ...... H04N 5/2256; H04N 5/247; H04N 7/181; E01B 35/10; E01B 2203/16

USPC .......................................................... 348/128
See application file for complete search history.

(56) References Cited

U.S. PATENT DOCUMENTS 5,368,260 A * 11/1994 Izbinsky .................. B61K 9/12
                                                            246/169 R
5,583,797 A * 12/1996 Fluegge ............. G01B 11/2755
                                                                 700/279

(Continued)

FOREIGN PATENT DOCUMENTS

CN           101982609            3/2011

OTHER PUBLICATIONS

International search report and written opinion of the international searching authority for co-pending PCT application No. PCT/US2016/055493 dated Jan. 13, 2017.

*Primary Examiner* — Tung T Vo
(74) *Attorney, Agent, or Firm* — Baker & McKenzie LLP

(57) ABSTRACT

A light reference system includes a first, second and third rail followers. The second rail follower is disposed between the first and third rail followers. First and second light sources are disposed on the first and third rail followers and operable to emit light towards the second rail follower. First and Second imaging devices are disposed on the second rail follower. The first imaging device is operable to receive the light emitted by the first light source and provide first image data. The second imaging device is operable to receive the light emitted by the second light source and provide second image data. A processing device is configured to perform a measurement, based on the first and second image data, indicating a relative position of the second rail follower with respect to at least one of the first and third rail followers.

21 Claims, 5 Drawing Sheets

(56) References Cited

U.S. PATENT DOCUMENTS

| | | | |
|---|---|---|---|
| 6,473,978 B1 * | 11/2002 | Maas | G01B 5/255 33/203.13 |
| 2003/0072001 A1 | 4/2003 | Mian et al. | |
| 2013/0096739 A1 | 4/2013 | Landes et al. | |
| 2013/0191070 A1 | 7/2013 | Kainer et al. | |
| 2013/0230212 A1 | 9/2013 | Landes et al. | |

* cited by examiner

LIGHT REFERENCE SYSTEM

CROSS-REFERENCE TO RELATED APPLICATION

This application claims priority to U.S. Provisional Application No. 62/237,137, filed on Oct. 5, 2015, the disclosure of which is incorporated herein by its entirety.

BACKGROUND

The present disclosure relates to a light reference system for measurement use with rail vehicles such as track correction equipment.

Railroads are typically constructed to include a pair of elongated, substantially parallel rails, which are coupled to a plurality of laterally extending ties. The ties are disposed on a ballast bed of hard particulate material such as gravel. Over time, normal wear and tear on the railroad may cause the rails to deviate from a desired geometric orientation.

Rail maintenance processes for addressing such concerns may include lifting rail panel with mechanical clamps, aligning the track by shifting it to a calculated position, and then tamping the ballast under each tie to hold the track in place. This work sequence may be repeated at each tie during the course of the correction process.

Conventional rail correction equipment includes a buggy vehicle tethered to a front end of a maintenance machine. The buggy vehicle may be a first reference point, while points near the workheads and the rear of the machine on corrected track provide additional reference points. The reference points are interconnected with steel wires that are tensioned between the first reference point (buggy vehicle) and the reference point at the corrected track. The vertical height between the tensioned wire and the reference point near the workheads is measured to calculate the track adjustment needed at that point. This approach is cumbersome requiring the tensioning of wires, and is subject to various mechanical issues such as wire tension, sag, and friction as well as the safety concern of having long tensioned wires in the work area. Therefore, an improved reference system is desired.

BRIEF SUMMARY

The present disclosure generally relates to an improved reference system and in particular an improved light reference system.

In an embodiment, a light reference system includes a first, second and third rail followers. The second rail follower is disposed between the first and third rail followers. A first light source is disposed on the first rail follower and operable to emit light towards the second rail follower. A second light source is disposed on the third rail follower and operable to emit light towards the second rail follower. A first imaging device is disposed on the second rail follower. The first imaging device is operable to receive the light emitted by the first light source and provide first image data. A second imaging device is disposed on the second rail follower. The second imaging device is operable to receive the light emitted by the second light source and provide second image data. A processing device is configured to perform a measurement, based on the first and second image data, indicating a relative position of the second rail follower with respect to at least one of the first and third rail followers.

In another embodiment, a rail maintenance vehicle includes a frame coupled to wheels that travel along rails and first, second and third support members respectively movably coupled to the frame. A first light source is disposed on the first support member and operable to emit light towards the second support member. A second light source is disposed on the third support member and operable to emit light towards the second support member. A first imaging device is disposed on the second support member. The first imaging device is operable to receive the light emitted by the first light source and provide first image data. A second imaging device is disposed on the second support member. The second imaging device is operable to receive the light emitted by the second light source and provide second image data. A processing device is configured to perform a measurement, based on the first and second image data, indicating a relative position of the second support member with respect to at least one of the first and third support members.

In still another embodiment, a method for determining a chordal offset of an axle of a rail vehicle includes: emitting light from a first axle of the rail vehicle towards a second axle of the rail vehicle; emitting light from a third axle of the rail vehicle towards the second axle; observing the light emitted from the first axle using a first imaging device coupled to a second axle; observing the light emitted from the third axle using a second imaging device coupled to the second axle; and determining, using a processor, a chordal offset between the second axle and a chord between the first axle and the third axle based on the observations of the first and second imaging devices.

BRIEF DESCRIPTION OF THE DRAWINGS

Reference is now made to the following descriptions taken in conjunction with the accompanying drawings.

DETAILED DESCRIPTION

Various embodiments of an improved reference system are described according to the present disclosure. It is to be understood, however, that the following explanation is merely exemplary in describing the devices and methods of the present disclosure. Accordingly, several modifications, changes, and substitutions are contemplated. For example, although the present disclosure mainly uses rail vehicles and measurement systems as an example application, the disclosed principles may be applied to any machine or system that uses a multiple point (e.g., three point) reference system.

In an embodiment, a light reference system may be used as part of a measurement system, which may operate alone, or be attached to or deployed on a rail vehicle. The measurement system may comprise first, second, and third axles. A first plurality of light sources may be disposed on the first axle to face one side of the second axle. A second plurality of light sources may be disposed on the third axle to face an opposite side of the second axle. A first camera may be mounted on the first side of the second axle to face the first plurality of light sources. Further, the first camera may capture an image of the first plurality of light sources and transmit a first camera sensor input to a processing device. Similarly, a second camera may be mounted on the second side of the second axle to face the second plurality of light sources. The second camera may capture an image of the second plurality of light sources and transmit a second camera sensor input to the processing device. Based on the first and second camera sensor inputs, the processing device may measure relative vertical and/or lateral positions of the first, second, and third axles. The measurement information may help the tamping machine to accurately move each rail of the track until the second axle sits in a desired position. Compared to a wire-based reference systems, the light reference system disclosed herein may avoid various mechanical issues such as wire tension, sag, and friction.

Figure 1:
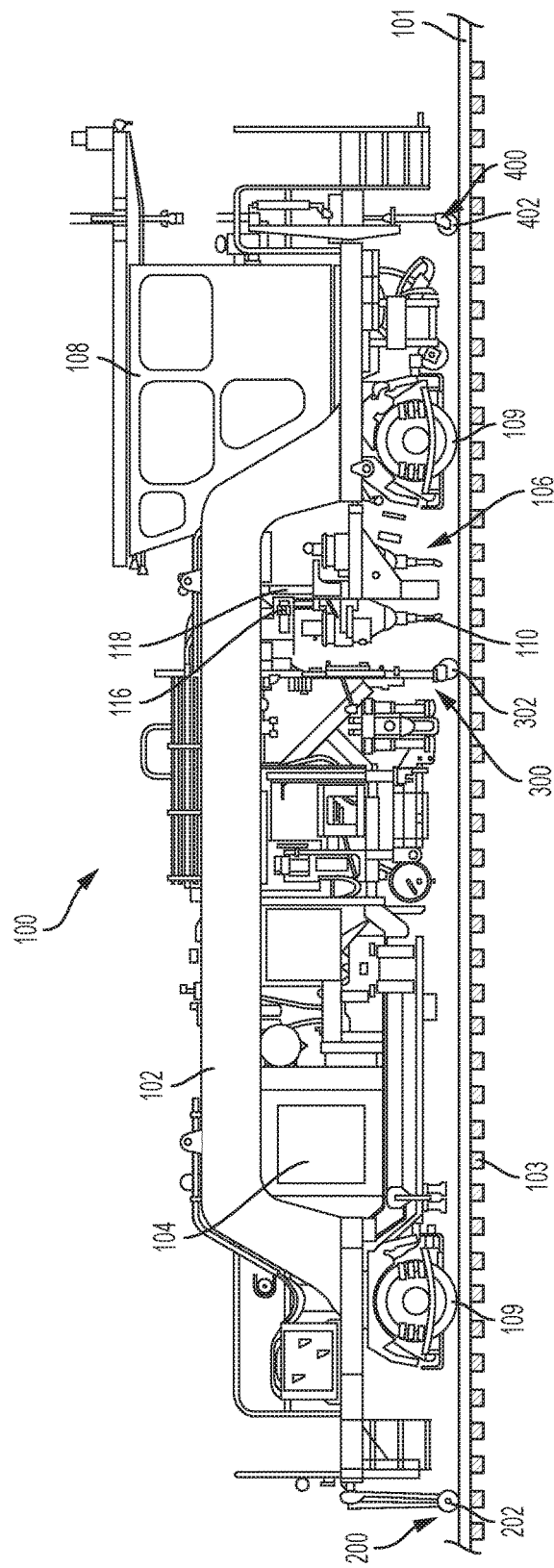
FIG. 1 is a side view of an exemplary rail maintenance vehicle.

Referring now to FIG. 1, in an embodiment, the light reference system is employed in a tamping machine rail vehicle. FIG. 1 shows a tamping vehicle 100 that includes a frame assembly 102, a propulsion device 104, a tamping device 106, and a cabin 108. Frame assembly 102 includes a plurality of rigid frame members and a plurality of wheels 109 that are configured to travel on the pair of rails 101. Tamping vehicle 100 travels across a pair of rails 101, disposed over a series of rail ties 103. The rails 101 and series of ties 103 are disposed over a bed of ballast. The propulsion system 104 is configured to move tamping vehicle 100. The tamping device 106 is configured to tamp rail ties 103. While the tamping vehicle 100 depicted in FIG. 1 contemplates a human operator for operating the vehicle, it is to be appreciated that, in some embodiments, the tamping vehicle may be operated as a drone vehicle, i.e., with no human operator onboard the vehicle during operation.

The tamping device 106 may include multiple workheads. In the side view of FIG. 1, one workhead can be viewed while another workhead is also included at an opposite side corresponding with the other rail. Any number of workheads (2, 4, etc) may be included. The tamping device 106 includes paddles 110 that are lowered into the ballast. The paddles 110 are vibrated by vibrators. The paddles 110 may be actuated by an actuator, which may be hydraulic, to squeeze the paddles around the rail ties. The tamping device 106 is coupled to the frame assembly 102 via a subframe 116 and an actuator 118. The actuator 118 is preferably a hydraulic actuator and is operable to lower the tamping device 106 such that the paddles 110 are inserted into the ballast where the squeezing and vibration action tamps the ballast. In a work cycle, the tamping vehicle 100 advances to position the tamping device 106 over a tie. The actuator 118 is actuated to lower the tamping device 106 to carry out the tamping of the ballast. Then, the actuator 118 is actuated to raise (and in some cases stow) the tamping device 106 for travel to the next tie.

The vehicle 100 is illustrated with three followers 200, 300 and 400. The follower 200 is disposed near a front of the vehicle at a location where work has not yet been performed. The follower 300 is disposed near the workhead (e.g., tamping device 106). The follower 400 is disposed near a back of the vehicle at a location where the work has been completed.

The followers respectively include wheels 202, 302 and 402 to engage the rails 101. The followers 200, 300 and 400 are movably coupled to the frame 102 so that the wheels 202, 302 and 402 remain in contact with the rails. In this respect, if the rails 101 define a longitudinal axis, then the followers may be constrained in the longitudinal axis such that they have a fixed longitudinal position while having freedom to move laterally and vertically such that they maintain their position with respect to the rails. In this respect, the followers 200, 300 and 400 may move independently of the frame 102. The followers 200, 300 and 400 may also be retracted vertically to disengage from the rails 101, for example, during transit to the work site. In some embodiments, the frame or portions thereof may move relative to the workhead. In such an embodiment, the followers, for example, the followers 200 and/or 400 may move with the frame. Thus, the longitudinal distance between the followers may change but is still known for a given measurement as the movement of the frame may be known or measured.

Figure 2:
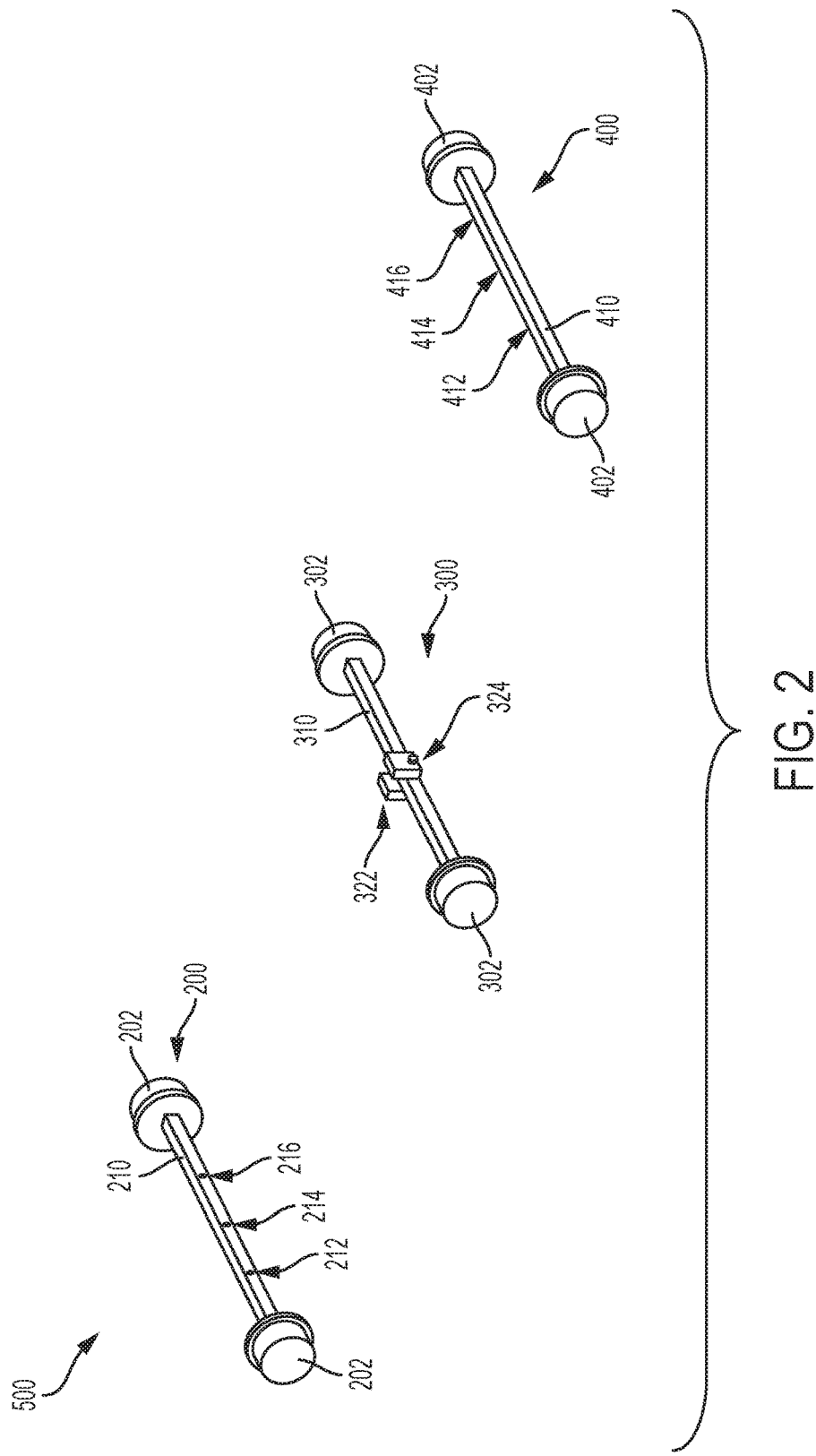
FIG. 2 is a simplified perspective view of a reference system of a rail maintenance vehicle.

FIG. 2 illustrates a simplified perspective view of a reference system of a rail maintenance vehicle. The light reference system 500 may comprise (or be attached to) frame members 210, 310 and 410. The frame members 210, 310, 410 may also be referred to as cross members or axles. The frame members 210, 310 and 410 may be respectively coupled to the wheels 202, 302 and 402, for example via bearings, such that the axles 210, 310 may maintain their orientation while the wheels spin.

The frame members 210, 310, and 410 may be rail vehicle axles. The axles 210, 310, and 410 may also be axles other than main rail axle vehicles, for example, axles dedicated to the light reference system 500. On straight, flat rail tracks, the axles 210, 310, and 410 may be configured to be generally parallel to each other, at the same height, and in a direction perpendicular to both rail tracks.

A plurality of light sources may be disposed on each of the axles 210 and 410. In an embodiment, three light emitting diodes (LEDs) 212, 214 and 216 may be disposed on the axle 210, while three LEDs 412, 414 and 416 may be disposed on the axle 410. LEDs may be preferable since they are small in size and produce bright light. The LEDs 212, 214 and 216 on the axle 210 are oriented to project light towards the axle 310. The LEDs 312, 314 and 316 are also oriented to project light towards the axle 310. In the perspective view of FIG. 2, the LEDs 412, 414 and 416 are on a back of the axle 410 and out of view. It will be understood that the LEDs 412, 414 and 416 may be a mirror image of the LEDs 212, 214 and 216 that are in view.

The LEDs may be disposed to be symmetrical about the axle 310. However, it should be understood that the numbers, positions, and/or types of light sources disposed on the axles 210 and 410 may be flexibly configured depending on the application. For example, although LEDs 212, 214, and 216 are illustrated evenly spaced on the axle 210, they may also be distributed unevenly.

To provide a three point reference setup, a plurality of cameras may be disposed on the middle axle 310 to receive light from the light sources on the axles 210 and 310. In an embodiment, a first camera 322 is disposed on a first side of the axle 310 to face the LEDs 212, 214 and 216 on the axle 210. A second camera 324 is disposed on a second, opposite side of the axle 210 to face the LEDs 412, 414, and 416 on the axle 410. The cameras 322 and 324 may be digital high resolution cameras that are rigidly mounted back-to-back on opposite sides of the axle 210 to maintain their position relative to each other. Further, in some embodiments, the cameras 322 and 324 may be calibrated so that they may be "looking" exactly or about 180 degrees away from each other.

Figure 3A:
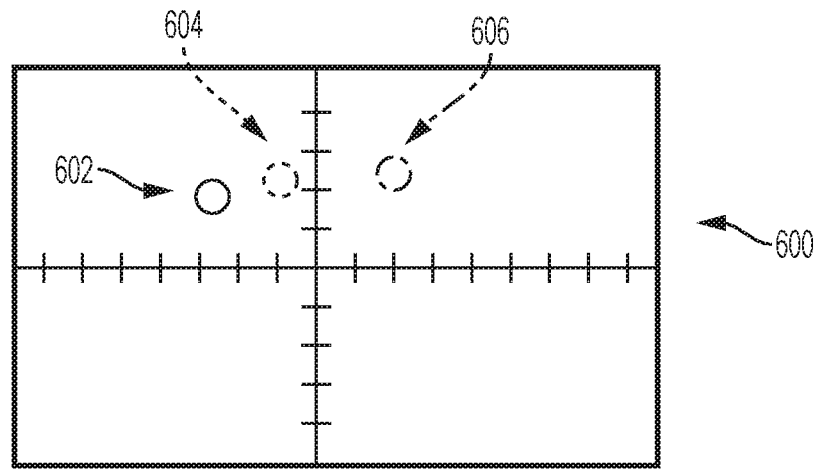
FIG. 3A is an exemplary image captured with a camera of a reference system.

Each camera 322 and 324 may be equipped with image sensors to receive light emitted by the light sources and generate images or snapshots based on received light energy. For example, the camera 322 may generate an output image or frame 600 (see FIG. 3A) showing LED objects 602, 604 and 606, which correspond to LEDs 212, 214 and 216, respectively. Since relative positions of LEDs 212, 214 and 216 are fixed, positions of the LED objects 602, 604 and 606 in the captured image 600 indicate how much the vehicle axle 310 has moved with respect to the vehicle axle 210. For example, positions of the LED objects 602, 604 and 606 in the image 600 may be measured relative to a vertical axis and a lateral (or horizontal) axis shown in the image 600. The camera 322 may be calibrated such that when the axles 210 and 310 are aligned both vertically and laterally, the LED objects 602, 604 and 606 are disposed on the lateral axis of the image 600 at pre-determined points. Alternatively, the locations of the LED objects 602, 604 and 606 may be recorded when the axles 210 and 310 are aligned to provide a base line for comparison of the locations of the objects 602, 604 and 606 when the axles 210 and 310 are not aligned. Further, the camera 322 may comprise or be coupled to a processing device, to which sensor input may be sent to analyze positions of each light source.

Figure 3B:
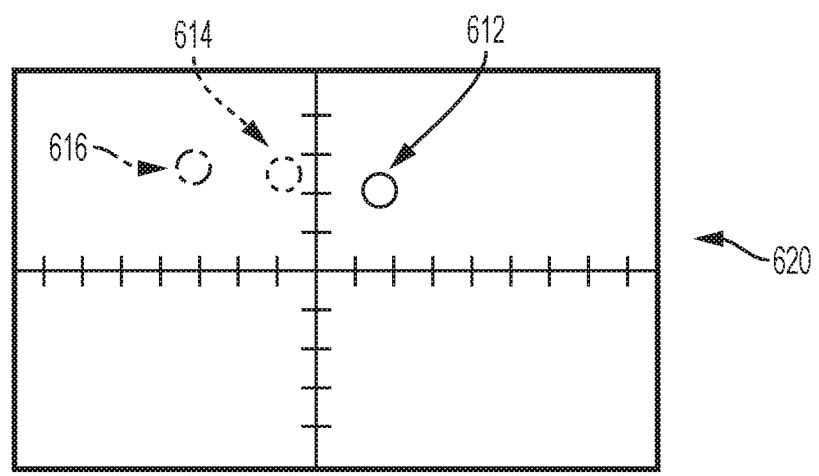
FIG. 3B is an exemplary image captured with a camera of a reference system.

Similarly, the camera 324 may generate an output image or frame 620 (see FIG. 3B) showing LED objects 612, 614 and 616, which correspond to LEDs 412, 414 and 416, respectively. By analyzing the positions of the LED objects 602, 604, 606, 612, 614 and 616, vertical and lateral position of the axle 310 may be determined relative to the axles 210 and 410. By having information from both cameras mounted on the axle 310, rotations of the axle 310 (if any) about any axis may be accounted for in calculating relative positions of the axles 210, 310 and 410. For example, axle rotation may be determined by comparing the locations of multiple light sources mounted on one axle to a calibrated axis of baseline position. In this way, the lateral rotation of the axle may be determined and it is not necessary to know or control the exact orientation at which the camera 322/324 is installed on the axle 310. Moreover, if the camera rotates during operation, the rotation can be detected and compensated using the same approach.

In an embodiment, each of the LEDs 212, 214 and 216 may have a different color (e.g., green, red, or blue) such that they may be distinguished by the camera 322. Alternatively, any other type of light source may be used. Preferably, the camera 322 may individually recognize or identify each of the LEDs 212, 214 and 216. For example, each light source may blink at a different frequency for the camera 322 to determine the identity of each, or each light source may have different sizes and/or shapes for identification. Further, the distributed LEDs 212, 214 and 216 allow the light reference system 500 to continue to function in the event that one of the LEDs 312, 314 and 316 becomes occluded to the camera 322 for some reason (e.g., line of sight blocked by an object). For example, the system 500 may continue using two of the LEDs 112, 114 and 116 though it is possible that some accuracy is lost due to the reduction of the number of light sources. The above discussion is similarly applicable to the camera 324 and the LEDs 412, 414 and 416, which may also be colored or otherwise distinguishable by the camera 324.

Figure 4:
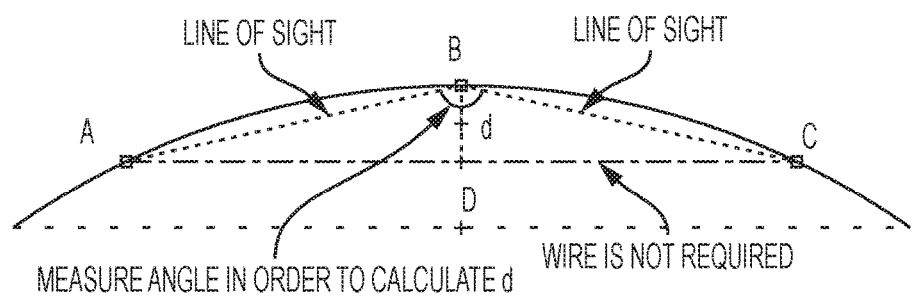
FIG. 4 is a schematic diagram illustrating an exemplary application of a light reference system for vertical measurement.

FIG. 4 is a schematic diagram illustrating an exemplary application of the light reference system 500 for vertical measurement. In an example, a rail vehicle (e.g., including a measurement system) including three axles may include three colored LED lights at point A (which may correspond with the follower 200), three colored LED lights at point C (which may correspond with the follower 400), and back-to-back digital cameras at point B (which may correspond with the follower 300) to determine a chordal offset at point B.

To the extent that each LED on an axle may have a different vertical position, points A, B and C may represent corresponding points on the axles 210, 310 and 410. In the case where the axle 310 sits at a mid-point between the axles 210 and 410, a line BD may perpendicularly intersect a line AC at mid-point D. However, it will be appreciated that the axle 310 may also be located at other positions.

As shown in FIG. 4, the camera 322 at point B may be placed in line of sight with the LED at point A, and the camera 324 (also considered to be at point B for illustration purposes) may be placed in line of sight with the LED at point C. Points A and C need not be in line of sight nor is a wire needed to connect points A and C. In an embodiment, by determining an inclusive angle between a first line AB and a second line CB, a chordal offset (e.g., the distance d) representing the length of line BD may be determined. The inclusive angle may be used to calculate the offset and the chordal offset does not need to be measured directly (for example, as would be required in a wire-based system).

Figure 5:
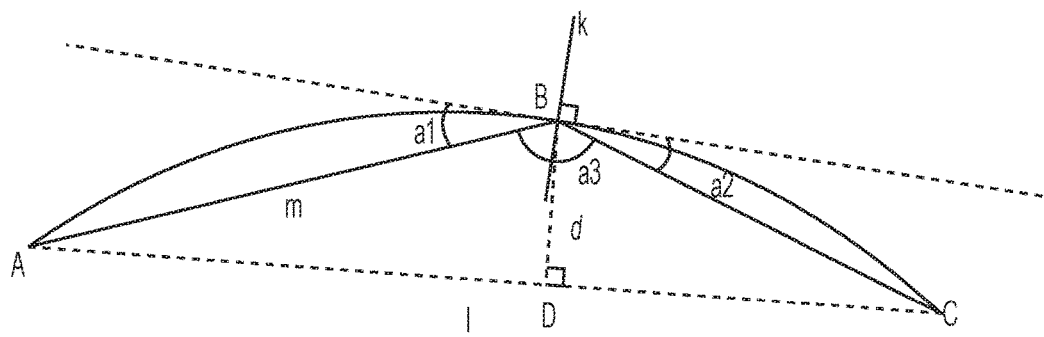
FIG. 5 is a schematic diagram illustrating an exemplary application of a light reference system for vertical measurement.

FIG. 5 is a schematic diagram further illustrating an exemplary application of the light reference system 500 for vertical measurement. As discussed above, each of the two cameras 322 and 324 (located at point B) may face opposite directions along a line perpendicular to the axle 310 upon which the cameras 322 and 324 are mounted. Accordingly, the cameras 322 and 324 may face 180 degrees away from each other. Each camera may sense light at a distance, e.g., from LEDs 212, 214, and 216 (at point A) and from LEDs 412, 414, and 416 (at point C). A controller (e.g., using a processor) may calculate angles a1 and a2 based on the location of the observed light sources in the image data information received by the cameras 322 and 324. In the case where the cameras 322 and 324 face 180 degrees apart, angle a3 equals (180−a1-a2) degrees. As an axle distance between points A and C (length l) is pre-determined and known, once angle a3 is determined, then the offset distance d can be trigonometrically calculated.

With the offset distance d determined for each rail, the twist in the track can be determined by comparing the difference between the determined vertical chord offset for the first rail with the determined vertical chord offset for the second rail. Determining the offset distance d for each rail may be performed using the same approach discussed above by selecting those LEDs near that rail. In an embodiment, a first plurality of LEDs on the respective axles may be disposed near the first rail and a second plurality of LEDs may be disposed near the second rail to increase the accuracy of individual rail measurements.

The cameras 322 and 324 not need face directions that are perfectly parallel with the line AC. Line k in FIG. 5 represents a direction perpendicular to the camera direction and a rotational angle of the axle 310. Line k may be perpendicular to the theoretical line AC (in which case lines k and d are parallel), or alternatively be at another angle with line AC. FIG. 5 is illustrated with a small misalignment that provides an angle between line k and line d. Embodiments disclosed herein permit variation in the mounting the cameras 322 and 324 on the axle 310, since the cameras 322 and 324 need not face a direction that is perfectly parallel with the line AC.

The light reference system 500 may possess various advantages over a wire-based measuring system. A three-point wire-based reference system may use a wire to directly connect points A and C. The chordal offset BD is directly measured as a distance d between B and D. Compared with the wire-based measuring system, the embodiments disclosed herein avoid mechanical issues of wire tension, sag, and friction. The present disclosure also reduces the width of clear area needed through a tamping machine near the center of rail and a top of rail. Further, the disclosed light reference system may avoid upper wires above each rail, which were used for direct vertical measurement.

According to some aspects disclosed herein, the light reference system 500 may calculate the vertical positions of each rail and each axle separately in order for a tamping machine to perform its work. Multiple light sources (e.g., LEDs 212, 214, 216, 412, 414 and 414) on each of the axles 210 and 410 may contribute to determining the vertical position of each rail.

Based on the principle of vertical measurement shown in FIG. 4, one of ordinary skill in the art would understand the lateral measurement may be similarly accomplished by comparing the lateral position of the light sources in the image data with the calibrated axis or the baseline image data. The same principles can be used for both vertical and lateral measurements but scaling may be used for vertical measurement as the light sources may be located inboard of the rails.

Spatial measurement information obtained by the light reference system may provide instructions to a machine control system, which may be part of a rail vehicle. The measurement information may allow the control system to move and adjust each rail of the track until the axle 310 is in the position required by control software. The light reference system 500 may produce necessary values for tamping system measurements, both before and after rail geometric correction, without the need for wires and the related clearance.

It should be understood that additional axles may be present on a rail vehicle, and additional set of light sources and cameras may be mounted thereon for measurement. For example, a third set of light sources may be disposed on a second side of the axle 410, which is opposite to the side on which LEDs 412, 414 and 416 are disposed. A measurement system (which may be included on a rail vehicle) may comprise a fourth axle, on which a third camera is mounted to face the third set of light sources on the second side of the third axle 410. Moreover, a fourth camera may be mounted on an opposite side of the fourth axle. The measurement system may further comprise a fifth axle, on which a fourth set of light sources may be disposed to face the fourth camera. The third, fourth, and fifth axles may function as another independent light reference system. Such a setup may allow a tamping machine to measure and verify the track after the tamping machine has performed its work in correcting the geometry of the track.

It will be appreciated that the light measurement system may be provided on other rail equipment or on a rail vehicle that does not perform track maintenance. It will also be appreciated that while the followers of the light measurement system have been illustrated in a tamping machine, one or more of the followers may be coupled to an extension or buggy disposed a distance from the tamping machine.

It will also be appreciated that although the cameras have been illustrated and discussed disposed near the workheads and the light sources distal to the workheads (that is, the cameras are illustrated on the middle axle), in an alternative embodiment, the cameras may be provided on the outer axles and the light sources provided at the inner axle.

It will also be appreciated that while two cameras or a back-to-back camera has been described, the embodiments are not limited to multiple cameras. For example, an optical system may be used with mirrors or beam splitting cubes to provide a composite image of both distal axles to a single camera.

Figure 6:
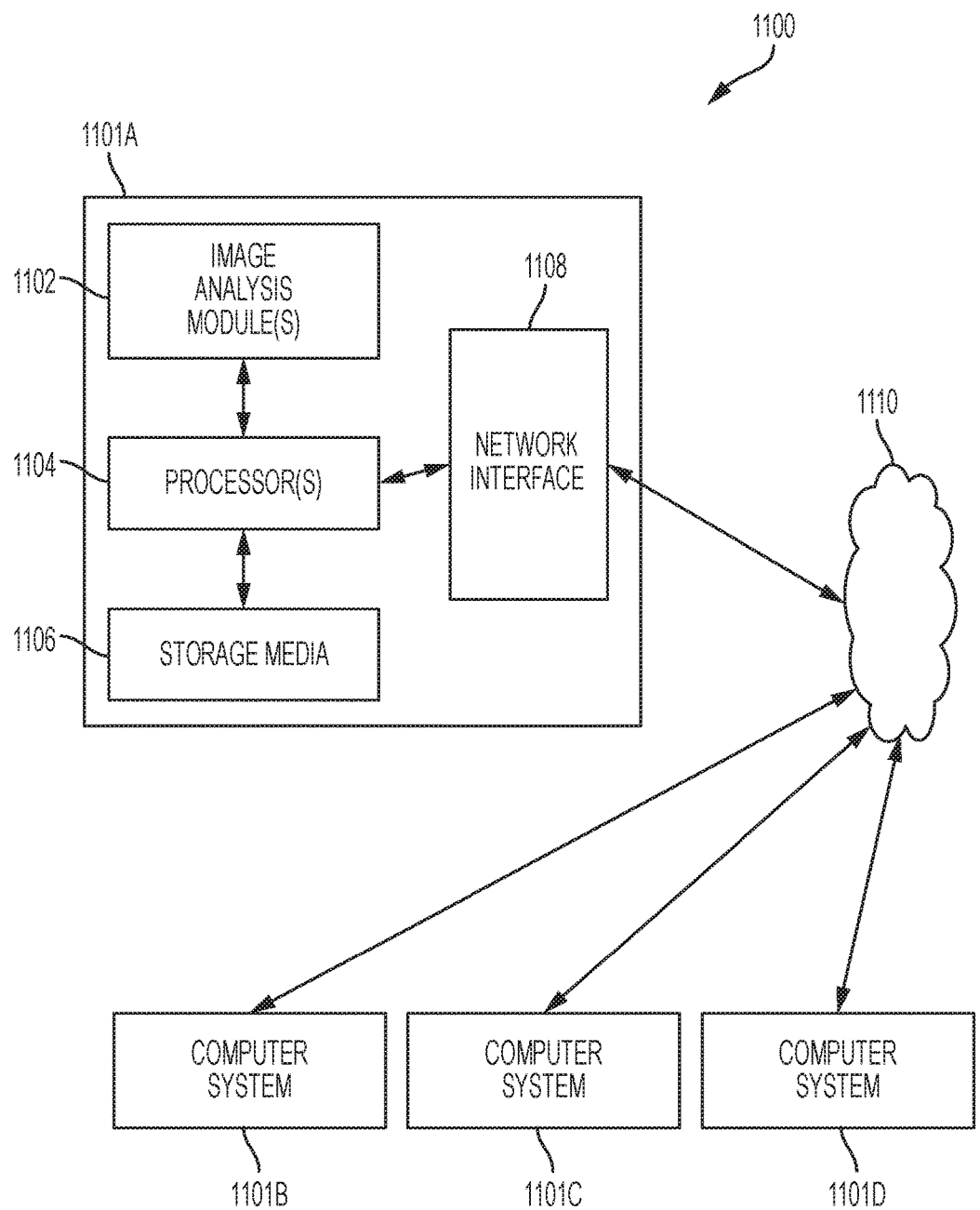
FIG. 6 illustrates an exemplary computing system in accordance with an embodiment.

FIG. 6 depicts an example computing system 1100 in accordance with some embodiments. The computing system 1100 can be an individual computer system 1101A or an arrangement of distributed computer systems. The computer system 1101A includes one or more image analysis modules 1102 that are configured to perform various tasks according to some embodiments, such as one or more methods disclosed herein. To perform these various tasks, image analysis module 1102 executes independently, or in coordination with, one or more processors 1104, which is (or are) connected to one or more storage media 1106A. The processor(s) 1104 is (or are) also connected to a network interface 1108 to allow the computer system 1101A to communicate over a data network 1110 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be on another maintenance vehicle, while in communication with one or more computer systems such as 1101C and/or 1101D that are located at one or more control desks at other locations. Note that data network 1110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 1106A can be implemented as one or more computer-readable or machine-readable storage media. Note that while in the example embodiment of FIG. 6 storage media 1106A is depicted as within computer system 1101A, in some embodiments, storage media 1106A may be distributed within and/or across multiple internal and/or external enclosures of computing system 1101A and/or additional computing systems. Storage media 1106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 1101A is one example of a computing system, and that computer system 1101A may have more or fewer components than shown, may combine additional components not depicted in the example embodiment of FIG. 6, and/or computer system 1101A may have a different configuration or arrangement of the components depicted in FIG. 6. The various components shown in FIG. 6 may be implemented in hardware, software, or a combination of both, hardware and software, including one or more signal processing and/or application specific integrated circuits.

It should also be appreciated that while no user input/output peripherals are illustrated with respect to computer systems 1101A, 1101B, 1101C, and 1101D, many embodiments of computing system 1100 include computing systems with keyboards, mice, touch screens, displays, etc. Some computing systems in use in computing system 2100 may be desktop workstations, laptops, tablet computers, smartphones, server computers, etc.

Further, the steps in the processing methods described herein may be implemented by running one or more functional modules in information processing apparatus such as general purpose processors, graphics processing units or application specific chips, such as ASICs, FPGAs, PLDs, or other appropriate devices. These modules, combinations of these modules, and/or their combination with general hardware are included within the scope of protection of the disclosure.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

The invention claimed is:

1. A light reference system for a rail vehicle, comprising:
a first rail follower, a second rail follower and a third rail follower respectively coupled to the rail vehicle, the second rail follower being disposed between the first and third rail followers;
a first light source disposed on the first rail follower and operable to emit light towards the second rail follower;
a second light source disposed on the third rail follower and operable to emit light towards the second rail follower;
a first imaging device disposed on the second rail follower, the first imaging device being operable to receive the light emitted by the first light source and provide first image data representing the light received from the first light source;
a second imaging device disposed on the second rail follower, the second imaging device being operable to receive the light emitted by the second light source and provide second image data representing the light received from the second light source; and
a processing device configured to
perform a measurement, based on the first image data and second image data, indicating an alignment of the second rail follower with respect to at least one of the first rail follower and third rail follower, and
determine at least one of a lateral chord offset, a vertical chord offset, and a twist in a pair of rails.

2. The light reference system of claim 1, wherein the first light source includes a plurality of LEDs.

3. The light reference system of claim 2, wherein each of the plurality of LEDs is a different color.

4. The light reference system of claim 1, wherein the first imaging device and the second imaging device are oriented in different directions.

5. The light reference system of claim 4, wherein the first imaging device is oriented in a direction 180 degrees from a direction in which the second imaging device is oriented.

6. The light reference system of claim 1, wherein the first imaging device is coupled to a first side of a support member, and the second imaging device is coupled to a second, opposing side of the support member.

7. The light reference system of claim 1, wherein the processor is configured to determine a chordal length between the second rail follower and a chord between the first rail follower and the third rail follower.

8. A rail maintenance vehicle, comprising:
a frame coupled to wheels that travel along rails;
first, second and third support members respectively movably coupled to the frame;
a first light source disposed on the first support member and operable to emit light towards the second support member;
a second light source disposed on the third support member and operable to emit light towards the second support member;
a first imaging device disposed on the second support member, the first imaging device being operable to receive the light emitted by the first light source and provide first image data representing the light received from the first light source;
a second imaging device disposed on the second support member, the second imaging device being operable to receive the light emitted by the second light source and provide second image data representing the light received from the second light source; and
a processing device configured to
perform a measurement, based on the first image data and second image data, indicating an alignment of the second support member with respect to at least one of the first support member and third support member, and
determine at least one of a lateral chord offset, a vertical chord offset, and a twist of the rails.

9. The rail maintenance vehicle of claim 8, wherein each of the first support member, second support member and third support member respectively couple to the rails by follower wheels.

10. The rail maintenance vehicle of claim 8, wherein the first support member is disposed proximal a first end of the vehicle, the second support member is disposed proximal a workhead of the vehicle, and the third support member is disposed proximal a second end of the vehicle.

11. The rail maintenance vehicle of claim 8, wherein the first light source includes a plurality of LEDs.

12. The rail maintenance vehicle of claim 11, wherein each of the plurality of LEDs is a different color.

13. The rail maintenance vehicle of claim 8, wherein the first imaging device and the second imaging device are oriented in different directions.

14. The rail maintenance vehicle of claim 8, wherein the first imaging device is coupled to a first side of the second support member, and the second imaging device is coupled to a second, opposing side of the second support member.

15. The rail maintenance vehicle of claim 8, wherein the processor is configured to determine a chordal length between the second rail follower and a chord between the first rail follower and the third rail follower.

16. A method for determining a chordal offset of an axle of a rail vehicle, comprising:
    emitting light from a first axle of the rail vehicle towards a second axle of the rail vehicle;
    emitting light from a third axle of the rail vehicle towards the second axle;
    observing the light emitted from the first axle using a first imaging device coupled to a second axle;
    observing the light emitted from the third axle using a second imaging device coupled to the second axle; and
    determining, using a processor, a chordal offset between the second axle and a chord between the first axle and the third axle based on the observations of the first and second imaging devices.

17. The method of claim 16, wherein the determining includes determining an angle between a plane perpendicular to the second axle and a chord between the second axle and the first axle.

18. The method of claim 17, wherein the determining includes determine the chordal offset based on the determined angle and a pre-determined distance between the first and third axles.

19. The method of claim 16, wherein the emitting light includes emitting a plurality of light signals from the first axle and the determining includes determining a lateral rotation of the first axle relative to the second axle.

20. The method of claim 16, wherein the first imaging device is coupled to a first side of the second axle, and the second imaging device is coupled to a second, opposing side of the second axle.

21. The method of claim 16, further comprising determining at least one of a lateral chordal offset and a twist in a pair of rails based on the observations of the first and second imaging devices.

* * * * *